United States Patent
Lee

(10) Patent No.: US 6,426,781 B1
(45) Date of Patent: *Jul. 30, 2002

(54) LASER VIDEO PROJECTOR

(75) Inventor: Jin-ho Lee, Suwon (KR)

(73) Assignee: Samsung Electronics Co., Ltd. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 09/276,673

(22) Filed: Mar. 26, 1999

(51) Int. Cl.$^7$ .............................. H04N 5/64; H04N 5/74; H04N 9/31; G02F 5/74; G03B 21/00; G03B 21/14

(52) U.S. Cl. .................. 348/754; 348/744; 348/750; 348/758; 348/759; 348/769; 353/82; 353/31; 353/94; 353/46; 353/48

(58) Field of Search .............................. 348/744, 750, 348/758, 759, 754, 769; 353/82, 31, 94, 46, 48

(56) References Cited

U.S. PATENT DOCUMENTS

| | | | | |
|---|---|---|---|---|
| 4,720,747 A | * | 1/1988 | Crowley | 358/231 |
| 4,851,918 A | * | 7/1989 | Crowley | 358/231 |
| 5,253,073 A | * | 10/1993 | Crowley | 358/231 |
| 5,255,082 A | * | 10/1993 | Tamada | 358/60 |
| 5,317,348 A | * | 5/1994 | Knize | 353/31 |
| 5,715,021 A | * | 2/1998 | Gibeau et al. | 348/750 |
| 5,774,174 A | * | 6/1998 | Hardie | 348/38 |
| 5,920,361 A | * | 7/1999 | Gibeau et al. | 348/750 |
| 6,018,408 A | * | 1/2000 | Hong | 359/201 |
| 6,020,937 A | * | 2/2000 | Bardmesser | 348/756 |
| 6,170,953 B1 | * | 1/2001 | Lee et al. | 353/82 |

* cited by examiner

Primary Examiner—John W. Miller
Assistant Examiner—Paulos Natnael
(74) Attorney, Agent, or Firm—Burns, Doane, Swecker & Mathis, LLP

(57) ABSTRACT

A laser video projector for modulating light from a laser light source by an acousto-optic modulator (AOM) according to a video signal and projecting video information to a screen using a scanner is provided. The laser video projector includes a light source for outputting a beam of white light formed of first, second, and third main wavelengths, a light separator for separating the beam of the white light into beams of monochromatic lights having first, second, and third main wavelengths in a predetermined transmission factor and a predetermined reflectivity, light modulator for modulating the beams of the monochromatic lights according to a chrominance signal, light combiner for combining the monochromatic lights modulated by the light modulator into a beam, and light scanner for scanning the combined beam of the modulated monochromatic lights, thus forming an image. Furthermore, it is possible to clearly separate the monochromatic light incident on the acousto-optic modulator and to intercept lights having different wavelengths, thus realizing the color of the image focused on the screen closer to a natural color, by using the light source the white light laser emitted from which is formed of monochromatic lights having three main wavelengths in the laser video projector and loading a dichroic mirror for clearly separating the main monochromatic lights into the laser video projector, considering the spectral luminous sensitivity of eyes according to the wavelengths of lights.

18 Claims, 3 Drawing Sheets

LASER VIDEO PROJECTOR

BACKGROUND OF THE INVENTION

1. Field of the Invention

The present invention relates to a laser video projector, and more particularly, to a laser video projector using a laser as a light source and for modulating light from the light source by an acousto-optic modulator (AOM) according to a video signal and projecting video information to a screen using a scanner.

2. Description of the Related Art

A flat panel display device such as a liquid crystal display or a cathode ray tube of a television set is a conventional representative video display means. However, the cathode ray tube or the liquid crystal display is more difficult to manufacture and the resolution becomes worse as the screen becomes larger. Accordingly, there are limits on the practical use of the cathode ray tube or the liquid crystal display the screen size of which becomes larger. Therefore, a method of enlarging an image displayed on the cathode ray tube or the liquid crystal display by a lens and projecting the enlarged image to a screen is used to realize a large screen.

A method of projecting red, green, and blue images to the screen one above the other using three cathode ray tubes and three lenses independently is disclosed in U.S. Pat. No. 4,942,525 and a method of composing images having the respective colors from the three cathode ray tubes and projecting the composed image to the screen by a lens is disclosed in U.S. Pat. No. 4,842,394.

The conventional video displaying method in the cathode ray tube or the liquid crystal display, used for displaying an image on a large screen has problems in that the picture projected to the screen is not clear since the displayed image is projected after being enlarged by the lens only and that the brightness is low since the output of the light source is limited since the video displaying means, in particular, an optical system can be damaged due to a temperature characteristic.

Also, spectral luminous efficacy of eyes varies according to the wavelengths of light. Namely, green light looks far brighter than red light or blue light in light having the same output. Therefore, when the spectral luminous efficacy of the eyes is not considered in the laser video projector which can form a large picture having high brightness and high resolution, the picture focused on a screen comes to have a color having poor contrast. Accordingly, it may not be possible to obtain a picture having high brightness and high resolution.

SUMMARY OF THE INVENTION

To solve the above problem, it is an object of the present invention to provide a laser video projector for projecting an image having high contrast and high brightness in which the color of the image focused on the screen is close to a natural color to a large screen considering the spectral luminous sensitivity of eyes according to the wavelengths of light.

Accordingly, to achieve the above object, there is provided a video projector comprising, a light source for outputting a beam of white light formed of first, second, and third main wavelengths, light separating means for separating the beam of the white light into beams of monochromatic lights having first, second, and third main wavelengths in a predetermined transmission factor and a predetermined reflectivity, light modulating means for modulating the beams of the monochromatic lights according to a chrominance signal, light combining means for combining the monochromatic lights modulated by the light modulating means into a beam, and light scanning means for scanning the combined beam of the modulated monochromatic lights, thus forming an image.

In the present invention, the light separating means preferably comprises a first dichroic mirror for reflecting at least 99% of monochromatic light having a first wavelength from the beam of the white light and transmitting at least 95% of monochromatic light having second and third wavelengths, a second dichroic mirror for reflecting at least 99% of monochromatic light having the second wavelength and transmitting at least 95% of monochromatic light having the third wavelength, and a high reflection mirror for reflecting at least 99% of the monochromatic light having the third wavelength.

Also, in the present invention, wherein the light modulating means preferably comprises three acousto-optic modulators for modulating the beams of the monochromatic lights having the first, second, and third wavelengths. The light combining means preferably comprises a third dichroic mirror for transmitting the beam of the monochromatic light having the first wavelength and reflecting the beam of the monochromatic light having the second and third wavelengths, a fourth dichroic mirror for reflecting the monochromatic light having the second wavelength and transmitting the monochromatic light having the third wavelength, and a high reflection mirror for reflecting the monochromatic light having the third wavelength.

BRIEF DESCRIPTION OF THE DRAWING(S)

The above object and advantages of the present invention will become more apparent by describing in detail a preferred embodiment thereof with reference to the attached drawings in which.

DESCRIPTION OF THE PREFERRED EMBODIMENTS

Hereinafter, a laser video projector according to the present invention will be described in detail with reference to the attached drawings.

According to the laser video projector according to the present invention, it is possible to obtain better picture quality not by forming an image by primary video displaying means but by scanning modulated light to a screen, to remarkably improve brightness by using a high-output light source, to project an image without conventional video displaying means such as a cathode ray tube and a liquid crystal display, and to display a color closer to a natural color by using a light source of white light having main wavelengths and a dichroic mirror which can separate the main wavelengths.

Figure 1:
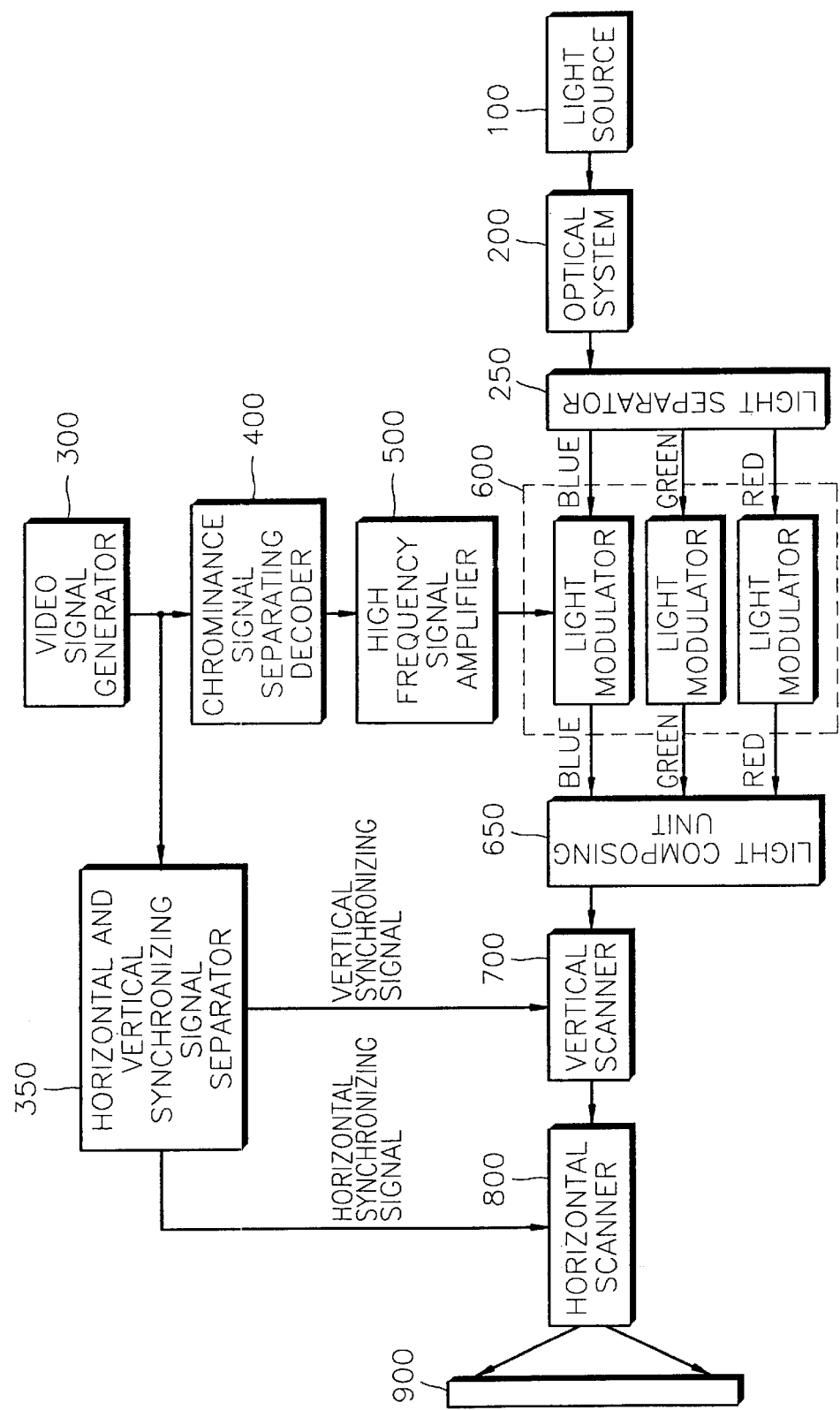
FIG. 1 is a schematic block diagram of a laser video projector according to the present invention.

FIG. 1 is a schematic block diagram of a laser video projector according to the present invention. As shown in FIG. 1, the laser video projector for projecting an image to a plurality of screens according to the present invention includes a light source 100 for emitting white light, an optical system 200 for collecting the white light emitted from the light source 100 in the form of a beam, a light separator 250 for separating the laser beam of white light incident from the optical system 200 into beams of red, green, and blue monochromatic lights, a video signal generator 300 for providing a predetermined video signal, a synchronizing signal separator 350 for separating horizontal and vertical synchronizing signals from the video signal provided from the video signal generator, a chrominance signal separating decoder 400 for separating a chrominance signal from the video signal provided from the video signal generator 300, a high frequency signal amplifier 500 for amplifying the chrominance signal separated from the chrominance signal separating decoder 400, a light modulator 600 for modulating the beam incident from the optical system 200 using the video signal (the chrominance signal) provided from the high frequency amplifier 500, a light composing unit 650 for combining the modulated red, green, and blue monochromatic lights, a vertical scanner 700 and a horizontal scanner 800 for scanning the combined laser beam from the light combining unit 650 to vertical and horizontal directions using the horizontal and vertical synchronizing signals provided from the synchronizing signal separator 350, and a screen 900.

Figure 2:
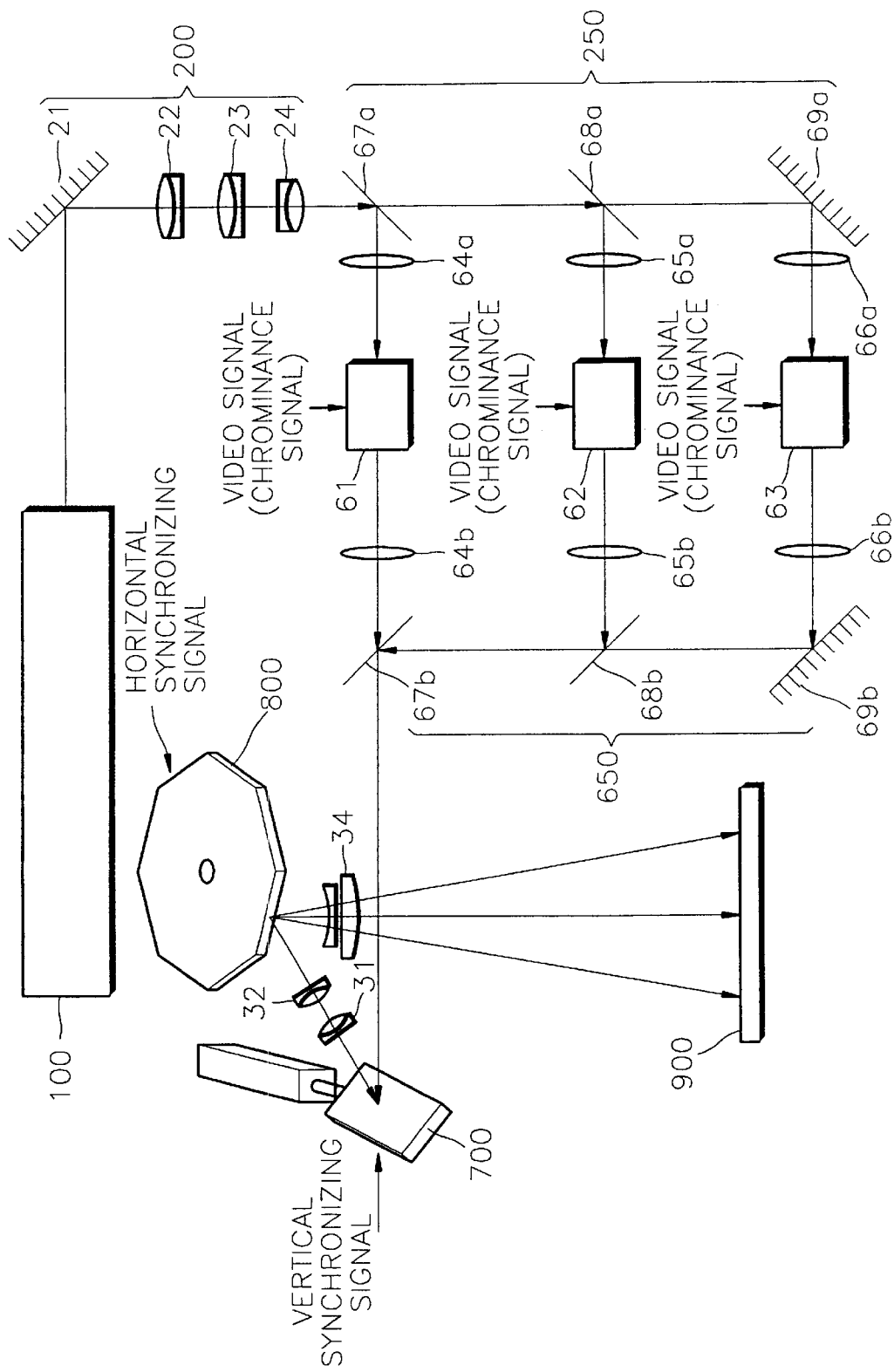
FIG. 2 shows the schematic arrangement of an optical system of the laser video projector of FIG. 1.

The embodiment of the laser video projector having the above structure is shown in FIG. 2. The light source 100 is formed of white light laser for generating white light. In particular, the main wavelengths of the white light laser beam emitted from the light source are respectively 488 nm, 514 nm, and 647 nm. The optical system 200 comprised of a high reflection mirror 21 for changing the path of the laser beam generated from the light source 100, a collimating lens 22 for changing the laser beam into parallel light, and telescoping lenses 23 and 24 for reducing the size of the parallel beam is arranged on the light path of the light source 100. In the telescoping lenses 23 and 24, one having a long focus distance is placed at a leading end and the other having a short focus distance is placed at a lagging end. The laser beam having a uniform divergence angle becomes a parallel beam, passing through the collimating lens 22 and comes to have a beam size reduced by the scaling ratios of the two lenses constructing the telescoping lens, passing through the telescoping lenses. The size of the beam is reduced so as to most effectively perform light modulation by an acousto-optic modulator (AOM) installed in a limited space.

The light separator 250 separates the laser beam of the white light incident from the telescoping lenses 23 and 24 of the optical system 200 into red, green, and blue monochromatic lights. The light separator 250 includes two dichroic mirrors 67a and 68a and a high reflection mirror 69a. The dichroic mirror 67a reflects at least 99% of blue light and transmits at least 95% of lights of other wavelengths. The dichroic mirror 68a reflects at least 99% of the green light and transmits at least 95% of the red light. The high reflection mirror 69a reflects the transmitted red light and makes the reflected light incident on an acousto-optic modulator 63. In particular, a dichroic mirror which remarkably improves a transmission factor and a reflectivity with respect to the main wavelengths of the light source 100, i.e., 488 nm, 514 nm, and 647 nm is used as the dichroic mirror.

The thickness of the beam incident on light modulators 61, 62, and 63 passing through the light separator 250 should be 200 μm, which is possible by installing focusing lenses 64a, 65a, and 66a at the leading ends of the light modulators 61, 62, and 63 by a uniform distance. The distance between the focusing lenses 64a, 65a, and 66a and the light modulators 61, 62, and 63 is determined according to the size of the beam incident on the focusing lenses 64a, 65a, and 66a. As the size of the beam becomes smaller, the distance between the focusing lenses 64a, 65a, and 66a and the light modulators 61, 62, and 63 for obtaining a 200 μm beam waist diameter from the light modulators 61, 62, and 63 becomes smaller. However, when the size of the beam is reduced too much, the lenses or the mirrors are damaged since the light intensity per unit area increases. Therefore, it is necessary to determine the appropriate size of the diameter of the beam.

The light modulator 600 includes three AOMs 61, 62, and 63 for modulating the beams of red, green, and blue monochromatic lights obtained by separating the beam of the white light, in the video signal provided by the video signal generator 300, provided by the light source 100 according to the chrominance signal (amplified by the high frequency amplifier 500) separated by a decoder 400 through the optical system 200 and the light separator 250 to the optical signals of the monochromatic lights.

The light combining unit 650 combines the beams of the monochromatic lights modulated to the optical signals by the acousto-optic modulators 61, 62, and 63 and forms a video signal in the form of a beam of various colors. The light combining unit 650 is comprised of dichroic mirrors 67b and 68b installed for combining the beams of the monochromatic lights into the video signal in the form of the beam to be projected to the screen 900 and a high reflection mirror 69b for changing the path of the separated monochromatic light.

The vertical scanner 700 includes a galvanometer. The horizontal scanner 800 includes a polygonal mirror.

The laser video projector for projecting an image to a plurality of screens having the above structure operates as follows.

Figure 3:
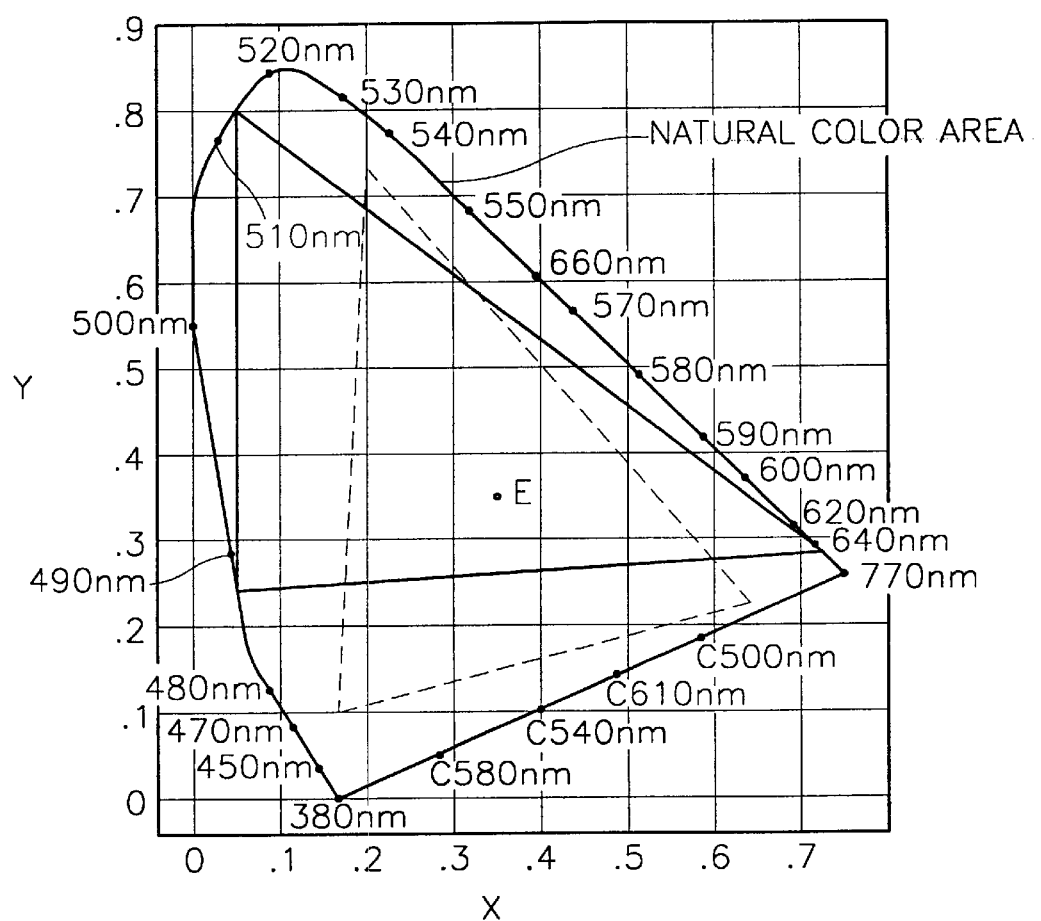
FIG. 3 is a chromatic diagram showing a chrominance realizing performance, considering the change of the spectral luminous sensitivity of eyes according to the wavelengths of light.

First, the white light emitted from the light source 100 is reflected to the high reflection mirror 21 and becomes the laser beam in the form of parallel light in the collimating lens 22. The laser beam is separated into blue, green, and red lights, passing through the telescoping lenses 23 and 24 and the dichroic mirrors 67a and 68a. The separated lights are incident on the acousto-optic modulators 61, 62, and 63. Namely, at least 99% of the blue light is reflected from the dichroic mirror 67a and is incident on the acousto-optic modulator 61. At least 95% of the light of the remaining wavelengths is transmitted. At least 99% of the green light is reflected from the dichroic mirror 68a and is incident on the acousto-optic modulator 62. At least 95% of the red light is transmitted. The transmitted red light is reflected by the high reflection mirror 69a and is incident on the acousto-optic modulator 63. Considering that the main wavelengths of the white light laser which is a single light source used for the laser video projector are 488 nm, 514 nm, and 647 nm, the dichroic mirror is installed so as to remarkably improve the transmission factor and the reflectivity with respect to the main wavelengths. It is possible to remarkably improve the chrominance realizing performance by improving the transmission factor and the reflectivity with respect to the main wavelengths of the white light laser beam. FIG. 3 is a chromatic diagram showing a chrominance realizing performance. In this drawing, the inside area of a triangle denotes the chrominance realizing performance. The triangle marked by a solid line denotes a chrominance realizing performance in the laser video projector according to the present invention. The triangle marked by a dotted line denotes a chrominance realizing performance of a conventional cathode ray tube television. A natural color area is marked with a thick curved line. In the case of the cathode ray tube television, the wavelengths of mainly used colors are around 470 nm, 540 nm, and 615 nm. It is noted that the chrominance realizing performance of the cathode ray tube television is much poorer than that of the laser video projector according to the present invention. In order to maintain the excellent chrominance realizing performance of the laser video projector 100%, the dichroic mirror should be completely designed. If a color breakup is not completely performed, the apexes of the triangle move inward by a ratio in which the color breakup is not performed. Accordingly, the chrominance realizing performance is reduced.

The chrominance signals of the blue, green, and red lights are separated by the chrominance signal separation decoder 400 in the video signal provided by the video signal generator 300. The focal lenses 64a, 65a, and 66a having an appropriate focal distance, arranged at the leading ends of the acousto-optic modulators are for maximizing the optical efficiency of the acousto-optic modulators 61, 62, and 63. The lenses 64b, 65b, and 66b having the same focal distance as that of the focal lenses 64a, 65a and 66a, placed at the lagging ends of the acousto-optic modulators 61, 62, and 63 are for restoring the size of the laser beams of the modulated monochromatic lights to the size of the laser beam in the form of the parallel light before being incident on the focal lenses 64a, 65a and 66a. The modulated blue, green, and red monochromatic lights are composed to a beam by the dichroic mirrors 67b and 68b and the high reflection mirror 69b. The green light is reflected from the dichroic mirror 68b. The red light passes through the dichroic mirror 68b. The blue light passes through the dichroic mirror 67b. The red and green lights are reflected from the dichroic mirror 67b. However, the design of the dichroic mirror and the separation order of the blue, green, and red lights can vary.

The light composed by the light combining unit 650 is vertically scanned by the vertical scanner 700 and horizontally scanned by the horizontal scanner 800. Accordingly, a picture is focused on a screen 900. Relay lenses 31 and 32 are included between the galvanometer of the vertical scanner 700 and the polygonal mirror of the horizontal scanner 800. The galvanometer of the vertical scanner 700 moves up and down at a speed synchronized by the vertical synchronizing signal separated from a horizontal or vertical synchronizing signal separator 350. The polygonal mirror of the horizontal scanner 800 rotates at a speed synchronized by the horizontal synchronizing signal separated from the horizontal or vertical synchronizing signal separator 350. Namely, the scanning path of the modulated beam is changed to be vertical by the galvanometer 700. The scanning path of the modulated beam is changed to be horizontal by the polygonal mirror 800. Accordingly, the beam is scanned to the entire surface of the screen 900. The relay lenses 31 and 32 between the galvanometer 700 and the polygonal mirror 800 collects light so that the vertically scanned laser beam is incident within the effective area of the polygonal mirror which is the horizontal scanning surface. The relay lenses 31 and 32 having the same focal distance are separated from each other by the addition of the focal distances.

Also, a fθ lens 34 is installed at the leading end on the side of the screen 900 of the polygonal mirror 800. The fθ lens 34 corrects the shape and the size of the beam focused on the screen to be identical in the entire area of the screen. Also, the fθ lens controls the divergence angle of the beam scanned to the screen, thus controlling the size of the beam required on the screen. Namely, the fθ lens controls the picture of the screen to always be natural even when the screen 900 moves back and forth.

As mentioned above, it is possible to obtain a large picture having high contrast and high resolution, which is closer to a natural color, using the laser video projector according to the present invention in which laser having wavelength advantageous to realizing a natural color is used as a light source and the dichroic mirror for completely separating images from light is included. Therefore, the laser video projector according to the present invention can be used for out door advertisements or a laser television of a large screen since it is possible to realize a large screen having high brightness and high resolution which is difficult to realize by the conventional video projector.

What is claimed is:

1. A laser video projector, comprising:
    a light source for outputting a beam of white light formed of first, second, and third main wavelengths;
    light separating means for separating the beam of the white light into beams of monochromatic lights having first, second, and third main wavelengths in a predetermined transmission factor and a predetermined reflectivity;
    an optical system for making the laser beam of the white light emitted from the light source a parallel beam and controlling the width of the parallel beam on a light path between the light source and the light separating means
    light modulating means for modulating the beams of the monochromatic lights according to a chrominance signal;
    light combining means for combining the monochromatic lights modulated by the light modulating means into a beam; and
    light scanning means for scanning the combined beam of the modulated monochromatic lights, thus forming an image.

2. The laser video projector of claim 1, wherein the light separating means comprises:
    a first dichroic mirror for reflecting at least 99% of monochromatic light having a first wavelength from the beam of the white light and transmitting at least 95% of monochromatic light having second and third wavelengths; and
    a second dichroic mirror for reflecting at least 99% of monochromatic light having the second wavelength and transmitting at least 95% of monochromatic light having the third wavelength.

3. The laser video projector of claim 2, wherein the light separating means further comprises a high reflection mirror for reflecting at least 99% of the monochromatic light having the third wavelength.

4. The laser video projector of claim 1, wherein the light modulating means comprises three acousto-optic modulators for modulating the beams of the monochromatic lights having the first, second, and third wavelengths.

5. The laser video projector of claim 1, wherein the light combining means comprises:
    a third dichroic mirror for transmitting the beam of the monochromatic light having the first wavelength and reflecting the beam of the monochromatic light having the second and third wavelengths; and
    a fourth dichroic mirror for reflecting the monochromatic light having the second wavelength and transmitting the monochromatic light having the third wavelength.

6. The laser video projector of claim 5, wherein the light combining means further comprises a high reflection mirror for reflecting the monochromatic light having the third wavelength.

7. The laser video projector of claim 6, wherein the first, second, and third wavelengths are 488 nm, 514 nm, and 647 nm, respectively.

8. The laser video projector of claim 1, wherein the first, second, and third wavelengths are 488 nm, 514 nm, and 647 nm, respectively.

9. The laser video projector of claim 1, wherein the optical system comprises:
- a collimating lens for changing the laser beam of the white light into parallel light; and
- telescoping lenses for controlling the thickness of the parallel light.

10. A laser video projector, comprising:
- a light source for outputting a beam of white light formed of first, second, and third main wavelengths;
- light separating means for separating the beam of the white light into beams of monochromatic lights having first, second, and third main wavelengths in a predetermined transmission factor and a predetermined reflectivity;
- light modulating means for modulating the beams of the monochromatic lights according to a chrominance signal;
- light combining means for combining the monochromatic lights modulated by the light modulating means into a beam;
- light scanning means for scanning the combined beam of the modulated monochromatic lights, thus forming an image, wherein the light scanning means comprises:
  - vertical scanning means for vertically scanning the combined beam output from the light composing means;
  - horizontal scanning means for horizontally scanning the combined beam output from the vertical scanning means; and
  - a screen for receiving the vertically and horizontally scanned combined beam and forming a picture; and
- a fθ lens for correcting a combined beam scanned to the screen on a light path between the horizontal scanning means and the screen.

11. The laser video projector of claim 10, wherein the vertical scanning means comprises a galvanometer.

12. The laser video projector of claim 10, wherein the horizontal scanning means comprises a polygonal mirror.

13. The laser video projector of claim 10, further comprising relay lenses for controlling the vertically scanned composed beam to be incident on the effective area of the horizontal scanning means on a light path between the vertical scanning means and the horizontal scanning means.

14. The laser video projector of claim 10, wherein the light separating means comprises:
- a first dichroic mirror for reflecting at least 99% of monochromatic light having a first wavelength from the beam of the white light and transmitting at least 95% of monochromatic light having second and third wavelengths; and
- a second dichroic mirror for reflecting at least 99% of monochromatic light having the second wavelength and transmitting at least 95% of monochromatic light having the third wavelength.

15. The laser video projector of claim 14, wherein the light separating means further comprises a high reflection mirror for reflecting at least 99% of the monochromatic light having the third wavelength.

16. The laser video projector of claim 10, wherein the light modulating means comprises three acousto-optic modulators for modulating the beams of the monochromatic lights having the first, second, and third wavelengths.

17. The laser video projector of claim 10, wherein the light combining means comprises:
- a third dichroic mirror for transmitting the beam of the monochromatic light having the first wavelength and reflecting the beam of the monochromatic light having the second and third wavelengths; and
- a fourth dichroic mirror for reflecting the monochromatic light having the second wavelength and transmitting the monochromatic light having the third wavelength.

18. The laser video projector of claim 17, wherein the light combining means further comprises a high reflection mirror for reflecting the monochromatic light having the third wavelength.

* * * * *